United States Patent
Ramanathan

(10) Patent No.: US 11,551,201 B1
(45) Date of Patent: Jan. 10, 2023

(54) WALLET TO WALLET P2P LENDING

(71) Applicant: Wells Fargo Bank, N.A., San Francisco, CA (US)

(72) Inventor: Ramanathan Ramanathan, Bellevue, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 135 days.

(21) Appl. No.: 17/249,659

(22) Filed: Mar. 9, 2021

Related U.S. Application Data

(63) Continuation of application No. 16/985,849, filed on Aug. 5, 2020, now Pat. No. 10,949,837, which is a continuation of application No. 15/629,440, filed on Jun. 21, 2017, now Pat. No. 10,755,263.

(51) Int. Cl.
  *G06Q 20/36* (2012.01)
  *G06Q 20/22* (2012.01)

(52) U.S. Cl.
  CPC ........... *G06Q 20/36* (2013.01); *G06Q 20/223* (2013.01)

(58) Field of Classification Search
  CPC ............................. G06Q 20/36; G06Q 20/223
  See application file for complete search history.

(56) References Cited

U.S. PATENT DOCUMENTS

| | | | |
|---|---|---|---|
| 8,190,522 B1 | 5/2012 | Vicente et al. | |
| 8,538,876 B2 | 9/2013 | Vicente et al. | |
| 8,630,929 B2 | 1/2014 | Haggerty et al. | |
| 10,755,263 B1 | 8/2020 | Ramanathan | |
| 10,949,837 B1 | 3/2021 | Ramanathan | |
| 2007/0127417 A1 | 6/2007 | Kalika | |
| 2011/0078077 A1 | 3/2011 | Hirson | |
| 2012/0239553 A1 | 9/2012 | Gonen | |
| 2014/0032394 A1 | 1/2014 | Liberty et al. | |
| 2015/0073982 A1* | 3/2015 | Prabhu | G06Q 20/36 705/41 |
| 2015/0310476 A1 | 10/2015 | Gadwa | |
| 2016/0162882 A1* | 6/2016 | McClung, III | G06Q 20/352 705/41 |
| 2016/0203522 A1 | 7/2016 | Shiffert | |
| 2017/0243025 A1* | 8/2017 | Kurian | H04L 9/3236 |
| 2017/0352025 A1* | 12/2017 | Loscher | G06Q 20/40 |
| 2017/0372392 A1 | 12/2017 | Metnick et al. | |
| 2018/0075453 A1 | 3/2018 | Durvasula et al. | |
| 2018/0310160 A1 | 10/2018 | Aoki | |

FOREIGN PATENT DOCUMENTS

WO WO-2015126331 A1 8/2015

OTHER PUBLICATIONS

"U.S. Appl. No. 15/629,440, Advisory Action dated Mar. 20, 2020".
(Continued)

*Primary Examiner* — Scott C Anderson
(74) *Attorney, Agent, or Firm* — Schwegman Lundberg & Woessner, P.A.

(57) ABSTRACT

Disclosed in some examples are methods, systems, and machine readable mediums for providing P2P lending through mobile wallets. The P2P lending may utilize a central registry or be a fully distributed P2P system. In some examples, the use of a network accessible P2P loan service may simplify the discovery and communication with other mobile wallets throughout the process of obtaining a loan.

20 Claims, 9 Drawing Sheets

(56) References Cited

OTHER PUBLICATIONS

"U.S. Appl. No. 15/629,440, Examiner Interview Summary dated Jan. 28, 2020".
"U.S. Appl. No. 15/629,440, Final Office Action dated Dec. 11, 2019", 11 pgs.
"U.S. Appl. No. 15/629,440, Non Final Office Action dated Jul. 5, 2019".
"U.S. Appl. No. 15/629,440, Notice of Allowance dated Apr. 21, 2020", 10 pgs.
"U.S. Appl. No. 15/629,440, Response filed Mar. 11, 2020 to Final Office Action dated Dec. 11, 2019".
"U.S. Appl. No. 15/629,440, Response filed Oct. 7, 2019 to Non-Final Office Action dated Jul. 5, 2019", 10 pgs.
"U.S. Appl. No. 16/985,849, Notice of Allowance dated Nov. 16, 2020".
"Extreme Marketing, "A History of WirelessStandards"", www.extremenetworks.com/extreme-networks-blog/a-history-of-wireless-standards-wi-fi-back-to-basics/, (Jul. 1, 2015), 2 pgs.
"With short-term personal loans, MobiKwik enters consumer loan segment", Press Trust of India, [Online], Retrieved from the Internet: <URL: https://yourstory.com/2016/10/mobikwik-consumer-loan-segment/, (Oct. 3, 2016), 3 pgs.
U.S. Appl. No. 15/629,440 U.S. Pat. No. 10,755,263, filed Jun. 21, 2017, Wallet to Wallet P2P Lending.
U.S. Appl. No. 16/985,837 U.S. Pat. No. 10,949,837, filed Aug. 5, 2020, Wallet to Wallet P2P Lending.

\* cited by examiner

WALLET TO WALLET P2P LENDING

CROSS-REFERENCE TO RELATED APPLICATION

This application is a continuation of U.S. patent application Ser. No. 16/985,849, filed on Aug. 5, 2020, which is a continuation of U.S. patent application Ser. No. 15/629,440, filed Jun. 21, 2017, now issued as U.S. Pat. No. 10,755,263, each of which are incorporated by reference herein in their entirety.

TECHNICAL FIELD

Embodiments pertain to computer systems for implementing electronic wallets (e.g., mobile wallets) and electronic payment methods. Some embodiments relate to computer systems and messaging that provide peer-to-peer lending using mobile wallets. Further embodiments relate to computer systems to facilitate wallet to wallet lender funding using additional wallet P2P or centralized funding.

BACKGROUND

A mobile wallet (also known as an electronic or digital wallet) refers to an application program executed by one or more computing devices (e.g., mobile devices such as a smartphone) and utilizing corresponding device memory which store and manage digital representations of elements (or items) typically found in a user's wallet or purse. These elements may comprise payment elements and non-payment elements. Payment elements are items which may be used in a financial transaction. Example payment elements managed by the digital wallet include digital representations of transaction cards, financial information, discount coupons, gift cards, subway passes, movie tickets, and so on. Example non-payment elements include digital representations of driver's licenses, passports, student IDs, library cards, membership cards, insurance cards, and so on. The mobile wallet application allows an individual to use the stored information to pay for items (either in person or in e-commerce transactions), provide for identification (e.g., producing a driver's license), transfer money to others, access bank accounts, collect discount coupons, submit subway passes, and the like. As another example, a mobile wallet may be used to verify the age of a buyer while purchasing alcohol. Exemplary mobile wallets include but are not limited to APPLE PAY®, ANDROID PAY®, GOOGLE WALLET®, CURRENT C® by MCX®, SAMSUNG PAY®, and peer-to-peer payment apps such as VENMO®, SQUARE CASH®, and TILT APP®.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
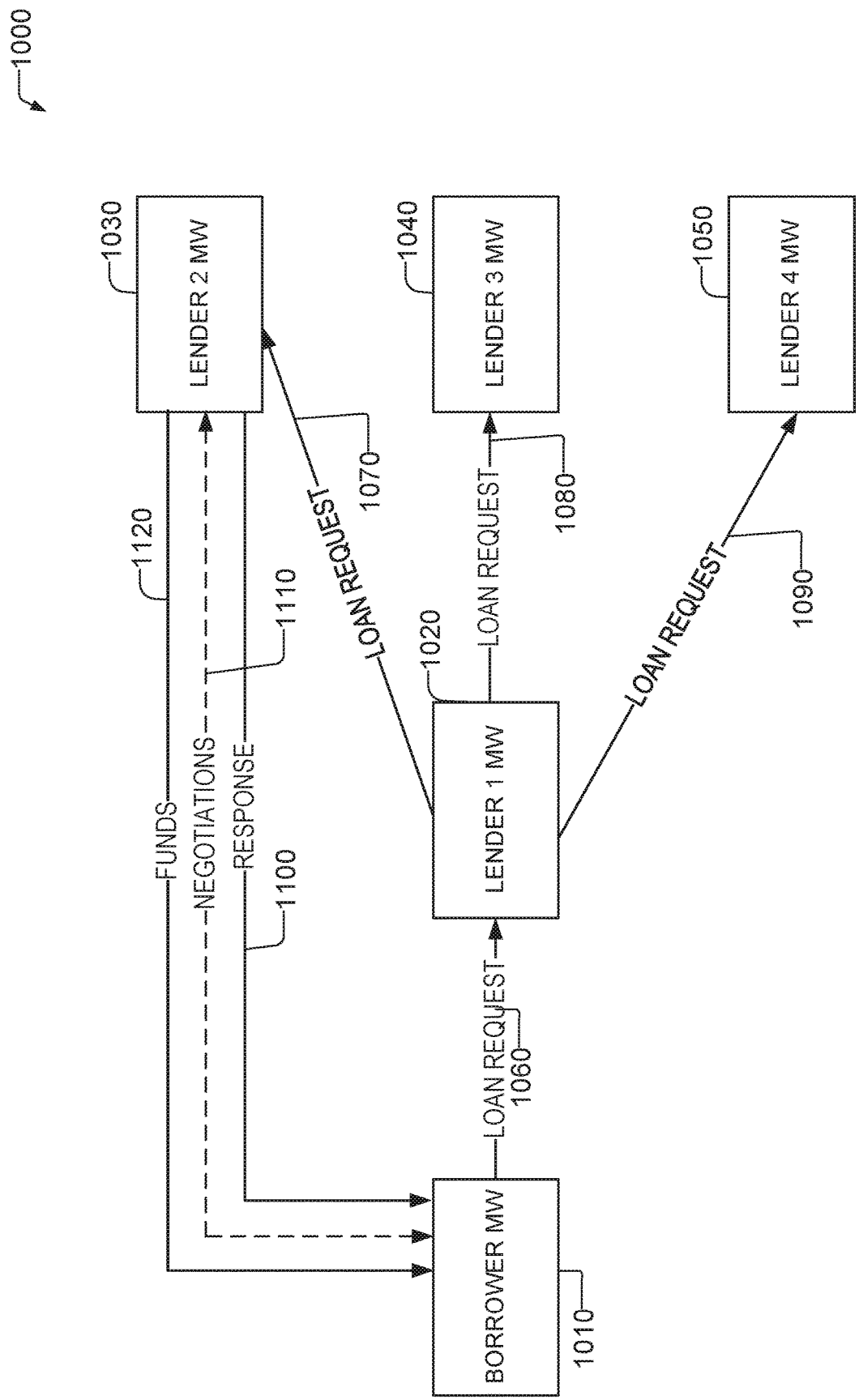
FIG. 1 shows a diagram of a peer-to-peer lending transaction according to some examples of the present disclosure.

A user trying to pay for an item through a mobile wallet may not have the funds available to make their purchase. That is, their payment elements may not have sufficient balance, or their credit accounts may not have a sufficient line of credit. Banks may not desire to extend credit to these individuals as the amount may be small, terms may be short (limiting the amount of interest that can be earned), or the individual's credit may not be acceptable. In some examples, other mobile wallet users may be willing to take on this risk. For example, individual investors may feel that certain users may be worth the risk if the interest rate and payment terms are desirable enough. In turn, these investors themselves may not have funds (or may not want to provide their own funds) available to loan to the original borrower.

Currently there is no system for effectively facilitating P2P mobile wallet lending, and in particular P2P mobile wallet multiple-hop lending whereby a first lender is funded by a second lender. In some examples, the first lender assumes the risk of non-payment from the borrower and the second lender assumes the risk of non-payment from the first lender. Thus, if the borrower defaults, the second lender may collect from the first lender. Other risk allocations may be envisioned. Indeed, there currently is not an effective P2P mobile wallet lending system whereby risk and other loan terms may be allocated.

Disclosed in some examples are methods, systems, and machine readable mediums for providing P2P lending through mobile wallets. The P2P lending may utilize a central registry or be a fully or semi-fully distributed P2P system. The borrower mobile wallet may request a loan from one or more potential lender mobile wallets. The potential lender mobile wallets and the borrower mobile wallet may negotiate terms of the loan. Once agreements are reached as to the terms of the loan, the lender mobile wallet may fund the loan from a mobile wallet transaction element, or as noted above, by obtaining another loan from a different mobile wallet. Loans may be for a portion of the amount requested, which may lead to multiple lender mobile wallets being utilized to satisfy the loan. The details of the loan(s) may be recorded into a database or a blockchain. A centralized network-based service (e.g., such as a bank or a P2P loan service) may provide risk assessment services to the potential mobile wallet lenders to allow them to determine how risky the loan is. For example, the risk assessment services may provide a credit score, or other indication of the risk associated with the mobile wallet loan. In some examples, loan payments may be automatically extracted from the payment elements in the mobile wallets subject to repayment rules. This makes borrowing and lending effortless in a mobile wallet ecosystem as well as reduces some of the risk by providing risk assessment and automatic payments.

As noted previously, the system may utilize a centralized P2P loan service, or may be fully distributed. The use of a network accessible P2P loan service may simplify the discovery and communication with other mobile wallets throughout the process of obtaining a loan. In contrast, examples that utilize a fully distributed P2P system may require more messaging and may not be as efficient in mobile wallet discovery and communications, but may be less expensive (as they may not charge a fee for each transaction) and may be more reliable as they do not rely upon a single point of failure (e.g., the P2P loan service).

In examples in which a central registry is utilized, the P2P borrower may request funds by sending a message to a P2P loan service. Mobile wallets interested in providing funding for P2P loans (potential lender mobile wallets) may register with the P2P loan service. The registration may include providing a set of one or more notification rules. The notification rules may specify rules for when the P2P loan service may contact each potential lender mobile wallet (e.g., when the proposed loan matches certain criteria). Thus each potential lender mobile wallet may determine which loans they may be interested in. Once notified, the lender mobile wallets may then accept or reject the entire proposed loan, or may decide to fund a portion of the proposed loan. The lender mobile wallets may also counter-offer different terms.

In some examples, the lender mobile wallets may be set up with action rules that automatically respond yes, no, or partial funding based upon the offered terms. In other examples, the lender mobile wallets may upload these action rules to the P2P loan service and the P2P loan service may be authorized to take action on behalf of the lender mobile wallet based upon the action rules. In some examples, a combination of notification and action rules may be set up. Thus the user may wish to be notified based upon a first criteria of the proposed loan and may provide the loan based upon second criteria. The P2P loan service may keep track of loans and terms as well as repayments via a blockchain or other database.

In examples that do not utilize a P2P loan service, the mobile wallets may discover other mobile wallets using a discovery procedure. When requesting a loan, the mobile wallet may send messages to discovered mobile wallets. These recipient mobile wallets may then forward the request to other mobile wallets that they had discovered. The network contact information of the borrower may be provided in the request. This enables subsequent communication (e.g., negotiations and funding) to be direct. In some examples, a decentralized blockchain may be utilized to track loans, terms of those loans, and repayments. In other examples, a P2P loan service may be utilized to write these items into a private blockchain or other database.

FIG. 1 shows a diagram of a peer-to-peer lending transaction 1000 according to some examples of the present disclosure. FIG. 1 shows a decentralized P2P example without the use of a centralized service. Borrower mobile wallet 1010 initiates a P2P mobile wallet loan. This may be in response to a determination of a user of a computing device corresponding to the borrower mobile wallet 1010 that they need funds, an automatic determination of the computing device (e.g., based upon an attempt to purchase goods, services, or transfer money that is not available or exceeds a credit limit of the user), or the like. Borrower mobile wallet 1010 may send a request for a loan to one or more lender mobile wallets that it is aware of (e.g., through a prior discovery procedure). For example, lender 1 mobile wallet 1020 may send a loan request 1060 to one or more other mobile wallets. Lender 1 mobile wallet 1020 may forward the loan request message to other mobile wallets it is aware of, such as lender 2 mobile wallet 1030, lender 3 mobile wallet 1040, and lender 4 mobile wallet 1050 with messages such as 1070, 1080, and 1090. In some examples, the request may have a "hop count" that tracks the number of recipients of the message. Once the hop count reaches zero (in the case that each hop decrements the counter) or equals a predetermined number (in the case that each hop increments the counter) the message is no longer passed onto other mobile wallets.

In the example of FIG. 1, the loan request 1060 may be sent to lender 1 mobile wallet 1020. Lender 1 mobile wallet 1020 may forward the request to lender 2 mobile wallet 1030, lender 3 mobile wallet 1040, and lender 4 mobile wallet 1050 using messages 1070, 1080, and 1090. These mobile wallets may then respond individually if they are interested in loaning money to borrower mobile wallet 1010, for example, with response message 1100. In some examples, the borrower mobile wallet 1010 proposes terms in the request message. Example terms may include payment amounts, payment frequency, interest rate, late penalties (e.g., amount and a definition of when the late payment is assessed and when it is due). In some examples, the response 1100 accepts the terms, rejects the terms and proposes new terms, or pledges a portion of the loan amount (rather than the whole amount). If the lender 2 mobile wallet 1030 does not accept the offered terms in the loan request, but instead proposes other terms, the borrower mobile wallet 1010 may accept, reject, or otherwise negotiate using messaging 1110 (in some examples, multiple messages back and forth may be sent during negotiations).

In some examples, once the terms are finalized, one or both of the borrower mobile wallet 1010 or the lender 2 mobile wallet 1030 may record the loan information. This may be done at a P2P loan service or the loan information may be written to a blockchain. The blockchain may be a private blockchain that is part of a financial institution or P2P loan service, or may be a distributed blockchain. Once the loan is recorded (the loan may be recorded by both parties as a symbol of acceptance), the lender 2 mobile wallet 1030 may disburse the funds to borrower mobile wallet 1010 in the amount of the loan with funds transfer 1120. The funds disbursement 1120 may utilize one or more payment processing services (not shown for clarity). In some examples, prior to disbursement of funds 1120, the lender 2 mobile wallet 1030 may verify that the borrower mobile wallet 1010 has indicated acceptance by registering the transaction on the blockchain or in the database of the P2P loan service. In some examples, one or more of the lender mobile wallets may contact a risk assessor (not shown for clarity) and pass the request of the borrower mobile wallet 1010. The loan request may have identifying information of the borrower mobile wallet 1010 that may be utilized by risk assessor to determine a financial risk to the lender mobile wallets based upon the terms. Risk assessor may be a network based actuarial service to determine a risk of lending to a particular mobile wallet borrower.

Figure 2:
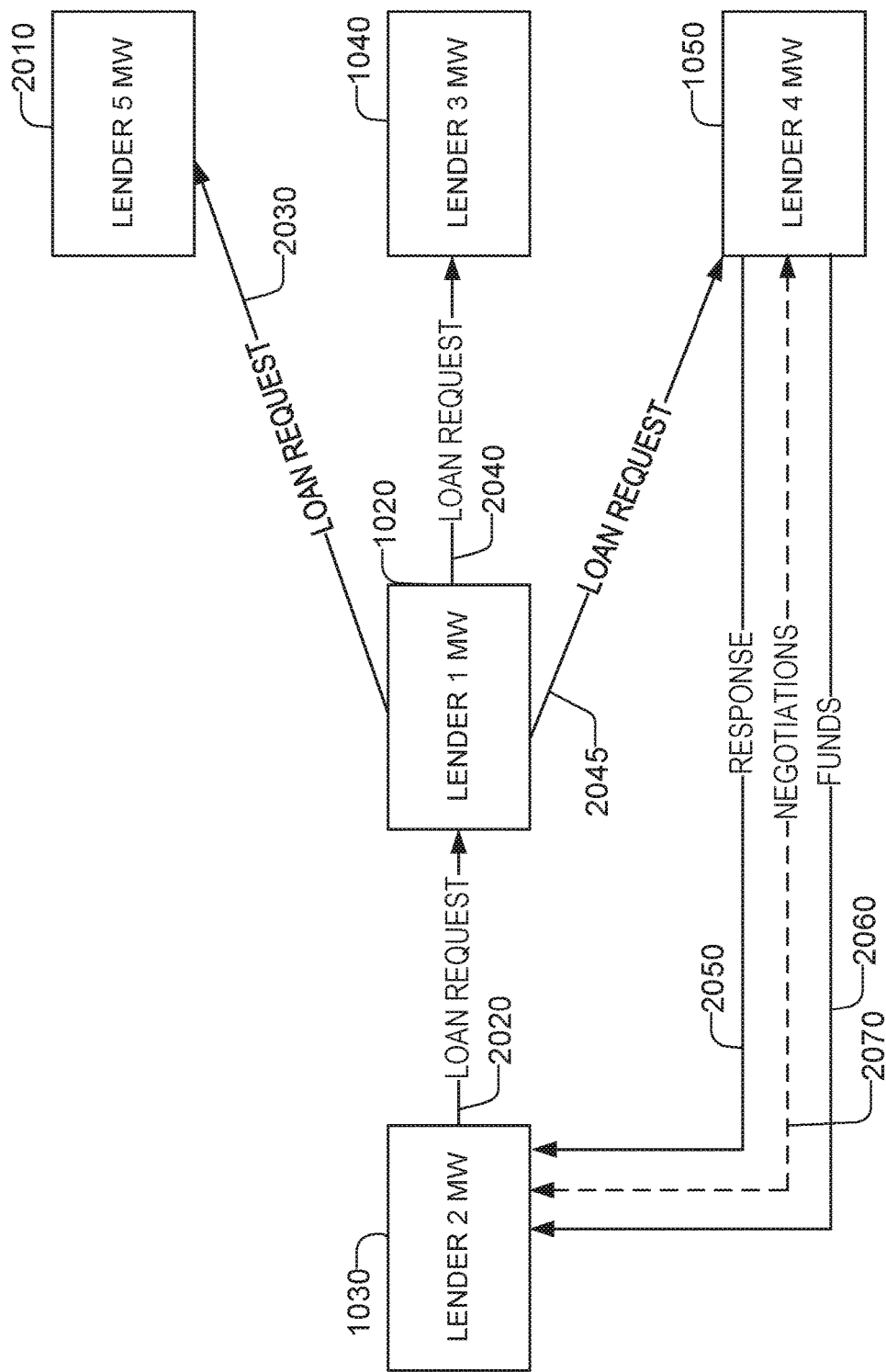
FIG. 2 shows a diagram of a peer-to-peer (P2P lender to lender mobile wallet loan transaction according to some examples of the present disclosure.

In some examples, in order to make funds available to fund the loan, lender 2 mobile wallet 1030 may borrow the money. For example, the lender 2 mobile wallet 1030 may be an intermediary between the true funding source (another mobile wallet) and the borrower mobile wallet (e.g., 1010). This may be useful if lender 2 mobile wallet 1030 is able to obtain credit a better terms from the ultimate funding source (the other mobile wallet) than the borrower mobile wallet. FIG. 2 shows a diagram of a peer-to-peer lender to lender mobile wallet loan transaction 2000 according to some examples of the present disclosure. In these examples, the lender 2 mobile wallet 1030 may carry out a process such as shown in FIG. 1. For example, lender 2 mobile wallet 1030 may send a loan request to one or more other lender mobile wallets, such as lender 1 mobile wallet 1020. Lender 1 mobile wallet 1020 may then send this request to other mobile wallets, such as lender 3 mobile wallet 1040, lender 4 mobile wallet 1050, and lender 5 mobile wallet 2010 using messages 2030, 2040, and 2045. In some examples, the lender 2 mobile wallet 1030 may include information on its loan to borrower mobile wallet 1010 in the request 2020. The use of an intermediary (lender 2 mobile wallet 1030) between the funding source (lender 4 mobile wallet 1050) and the borrower mobile wallet (1010) may be useful if lender 2 mobile wallet 1030 is able to get credit at a lower cost from lender 4 mobile wallet 1050 than is borrower mobile wallet 1010. Lender 2 mobile wallet 1030 then makes a profit that is the difference between the interest rate of its loan with lender 4 mobile wallet 1050 and the interest rate it offers to the borrower mobile wallet 1010.

In some examples, the process of FIG. 2 may be completed after the lender 2 mobile wallet 1030 agrees to fund (or partially fund) the loan to borrower mobile wallet 1010 or may be completed prior to the agreement to fund the loan to borrower mobile wallet 1010. In still other examples, the processes may overlap such that lender 2 mobile wallet 1030 can negotiate with both the borrower mobile wallet 1010 and the lender 4 mobile wallet 1050 to obtain favorable terms and ensure a profit should borrower mobile wallet 1010 not default. In FIG. 2, lender 4 mobile wallet 1050 may agree to lend lender 2 mobile wallet 1030 at least a portion of funds. As previously described, the response 2050 from lender 4 mobile wallet 1050 may accept, decline, propose new terms, or agree to partially fund the loan. One or more messages may be sent negotiating terms 2070 and once terms are agreed upon, the funds may be transferred at 2060 (as previously stated, this operation may make use of payment processing services). Once the funds are transferred 2060, the lender 2 mobile wallet may further transfer some or all of the funds to the borrower mobile wallet 1010.

Figure 3:
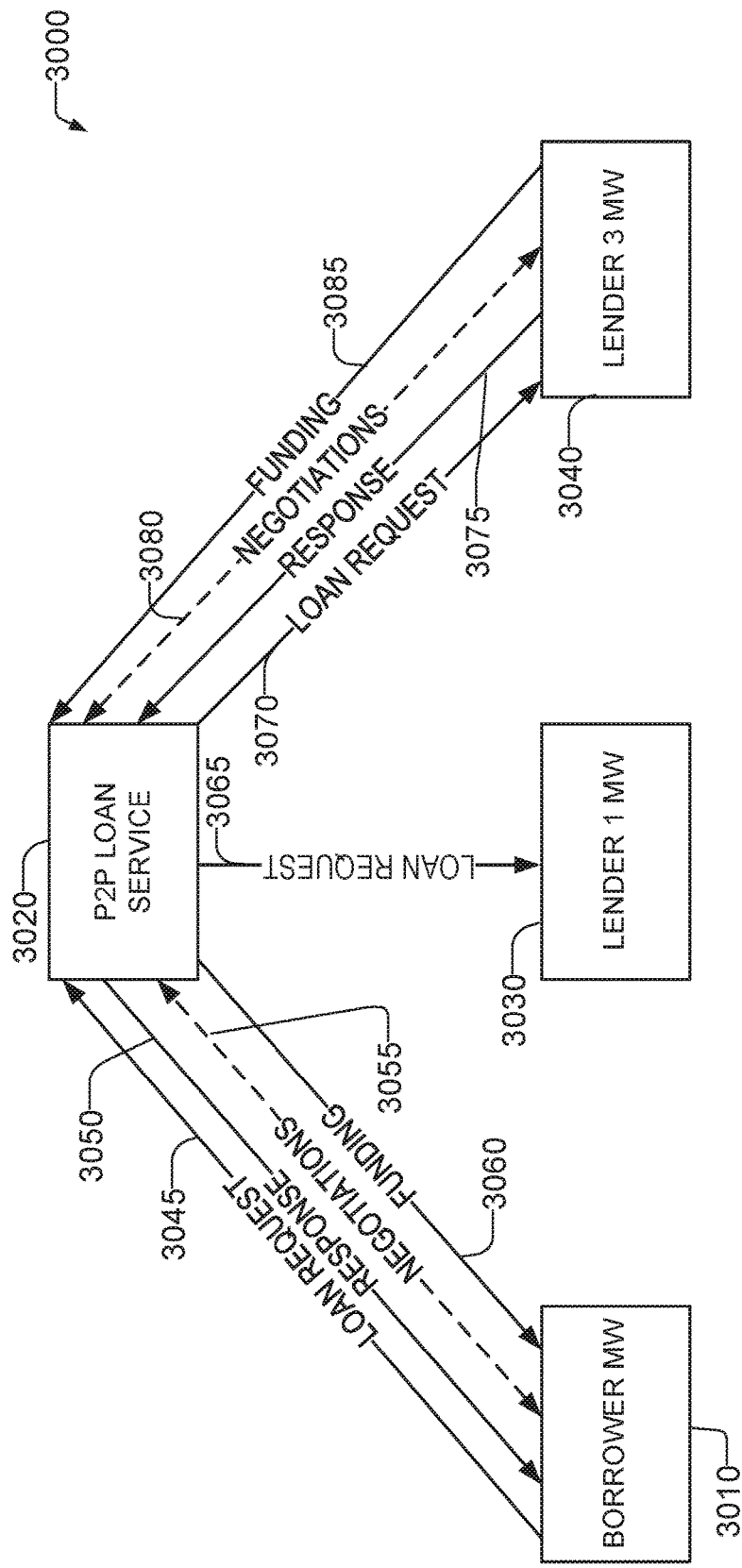
FIG. 3 shows a diagram of a P2P wallet-to-wallet loan using a centralized P2P loan service according to some examples of the present disclosure.

As previously described, the wallet-to-wallet P2P loans may be accomplished without a centralized management service such as a P2P loan service (with the exception in some examples of a payment processing service and also in some examples with the exception of a centralized blockchain). As previously noted, in other examples, the wallet-to-wallet P2P loans may utilize a centralized P2P loan service. FIG. 3 shows a diagram of a peer to peer wallet-to-wallet loan 3000 using a centralized P2P loan service according to some examples of the present disclosure. In order to obtain a loan, borrower mobile wallet 3010 may send a loan request 3045 to P2P loan service 3020. P2p loan service 3020 may forward the request (in some examples along with credit or risk information about the user of borrower mobile wallet 3010) to registered mobile wallet lenders, such as with messages 3065 and 3070. Interested mobile wallets may respond with response messages, such as response 3075. Response 3075 may be forwarded to the borrower mobile wallet 3010 using message 3050. More than one mobile wallet lender may respond.

The response may accept the borrower's proposed terms or include a counter offer. The borrower mobile wallet 3010 may choose among the responses to select a lender based upon the lender's offered terms. In some examples, the borrower mobile wallet 3010 and interested lender mobile wallets (e.g., lender 3 mobile wallet 3040) may negotiate terms. In the example of FIG. 3, borrower mobile wallet 3010 may negotiate with lender 3 mobile wallet 3040 using messages 3055 and 3080 (in some examples, multiple series of messages may be sent at this phase). Once the terms are agreed to, lender 3 mobile wallet 3040 may provide funds, such as by using message 3085 and 3060. While the messaging utilized to setup the loan is shown in FIG. 3 as being mediated by the P2P loan service, in some examples, the response messages, negotiation messages, and funding messages may be direct messages. As previously described, in the same way borrower mobile wallet 3010 obtained funding, the lender 3 mobile wallet 3040 may obtain funding to provide to the borrower mobile wallet 3010 using its own P2P loan.

As described above, the P2P loan service may store one or more notification criteria and in some examples, one or more action criteria. The notification criteria may specify particular criteria that a loan request must meet before the lender mobile wallet is even notified of the loan request. For example, if loan request 3045 did not meet the lender 1 mobile wallet 3030 notification criteria, the message 3065 may not be sent. Action criteria are criteria that, if met by the loan request, will automatically trigger the lender mobile wallet to accept and fund the loan. Action criteria may be implemented on the P2P loan service and/or the lender mobile wallet. For example, if the action criteria for lender 3 mobile wallet 3040 are met by the loan request 3045, the P2P loan service 3020 may automatically accept the loan by sending response 3050 and fund the loan using funding 3060 on behalf of the lender 3 mobile wallet 3040. The P2P loan service 3020 would then notify the lender 3 mobile wallet 3040 of an accepted loan on its behalf.

Figure 4:
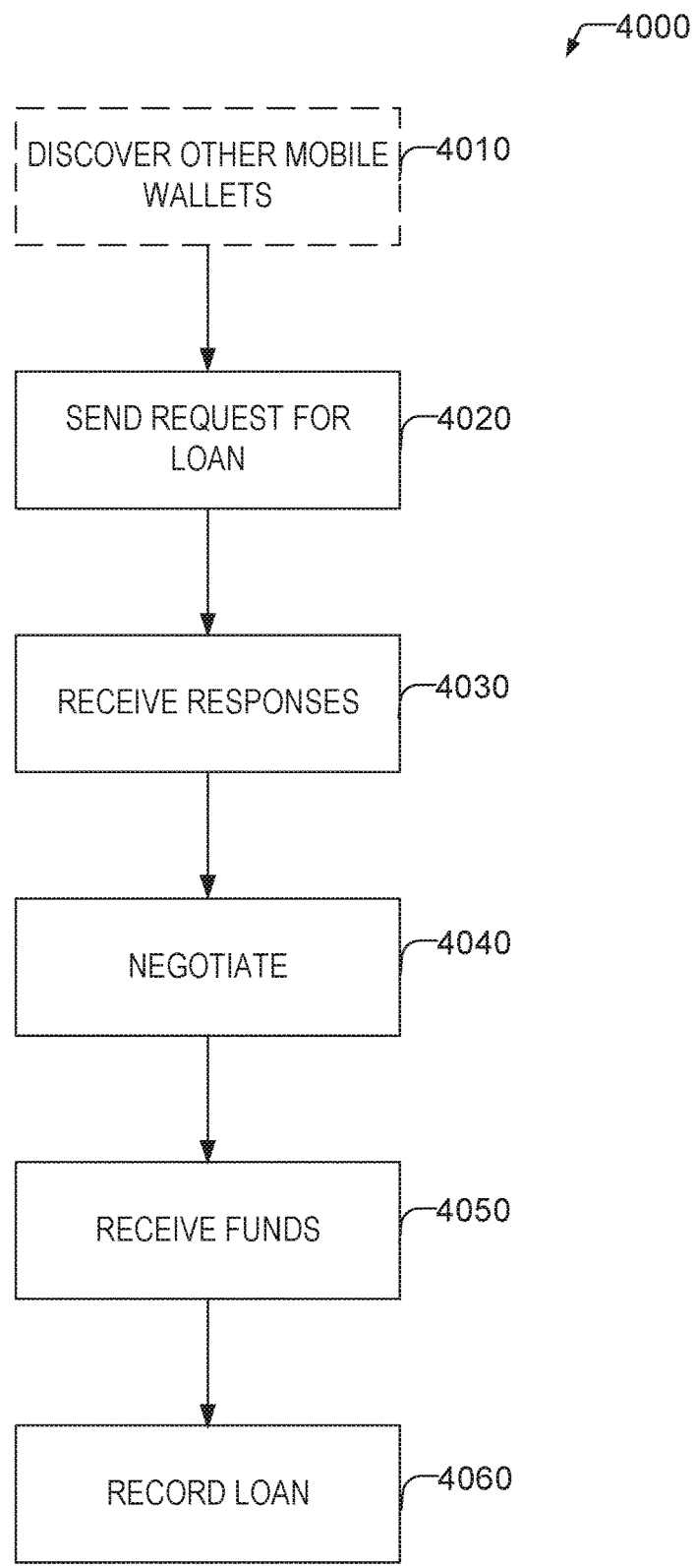
FIG. 4 shows a flowchart of a method of a P2P loan executed by a mobile wallet according to some examples of the present disclosure.

FIG. 4 shows a flowchart of a method of a P2P loan executed by a mobile wallet according to some examples of the present disclosure. FIG. 4 may be either the centralized or decentralized examples. At operation 4010, optionally in some examples, the mobile wallet may discover other mobile wallets. This discovery may utilize broadcast messages which may then be answered by other mobile wallets. These broadcast discovery messages may then be rebroadcasted by those mobile wallets to yet other mobile wallets, who may then respond. The mobile wallet may then store the address (e.g., an IP address or mobile wallet address) of the responding mobile wallets. In other examples, the mobile wallet may store a list of known mobile wallets. To initialize this list, the mobile wallet may be provided with (upon downloading the P2P application) a list of pre-existing or seed mobile wallets. In other examples, the mobile wallet may utilize a network-based service that has a list of seed mobile wallets. The mobile wallet may then contact these seed mobile wallets. Mobile wallets in the seed list that respond, may respond with their own list of known mobile wallets as well as the contact information of the mobile wallets on their list. Mobile wallets that do not respond may be removed from the list of known mobile wallets. The list of known mobile wallets may grow indefinitely, or may be limited to a predetermined number of wallets. In still other examples, the seed mobile wallets may comprise user-entered mobile wallet addresses, such as family or friends.

At operation 4020, the mobile wallet may send a request for a loan. In some examples, this may be done using a broadcast message where a first mobile wallet receives the request and passes it onto other mobile wallets over a broadcast message that is then passed onto other mobile wallets. In other examples, this may be done directly to one or more of the mobile wallets on its known mobile wallet list using contact information obtained in operation 4010. In some examples, the recipients then send the loan request to all the mobile wallets in their known mobile wallet lists, and so on. In yet other examples, this may be a request sent to a P2P loan service. At operation 4030 the mobile wallet may receive the responses from the other mobile wallets (either directly or in some examples through the P2P loan service). Responses may decline the loan request, accept the loan request at the mobile wallet's offered terms (e.g., monetary amount, repayment terms, and interest rate), propose new terms, or partially fulfill the monetary amount at the indicated repayment terms.

At operation 4040 the mobile wallet and the mobile wallets that responded may engage in negotiations. For example, the mobile wallet may counter-offer with different terms based upon the received responses. Various rounds of offer and counter offer may be implemented until either an agreement is reached, or one party gives up. Once an agreement is reached, the mobile wallet may accept the terms from one or more other lender mobile wallets (e.g., send an acceptance message) and may receive the funds at operation 4050. At operation 4060 the loan may be recorded. For example, by sending the transaction to another mobile wallet for inclusion in a block of a blockchain. As previously noted, in some examples, the loan may be recorded prior to receipt of the funds.

Figure 5:
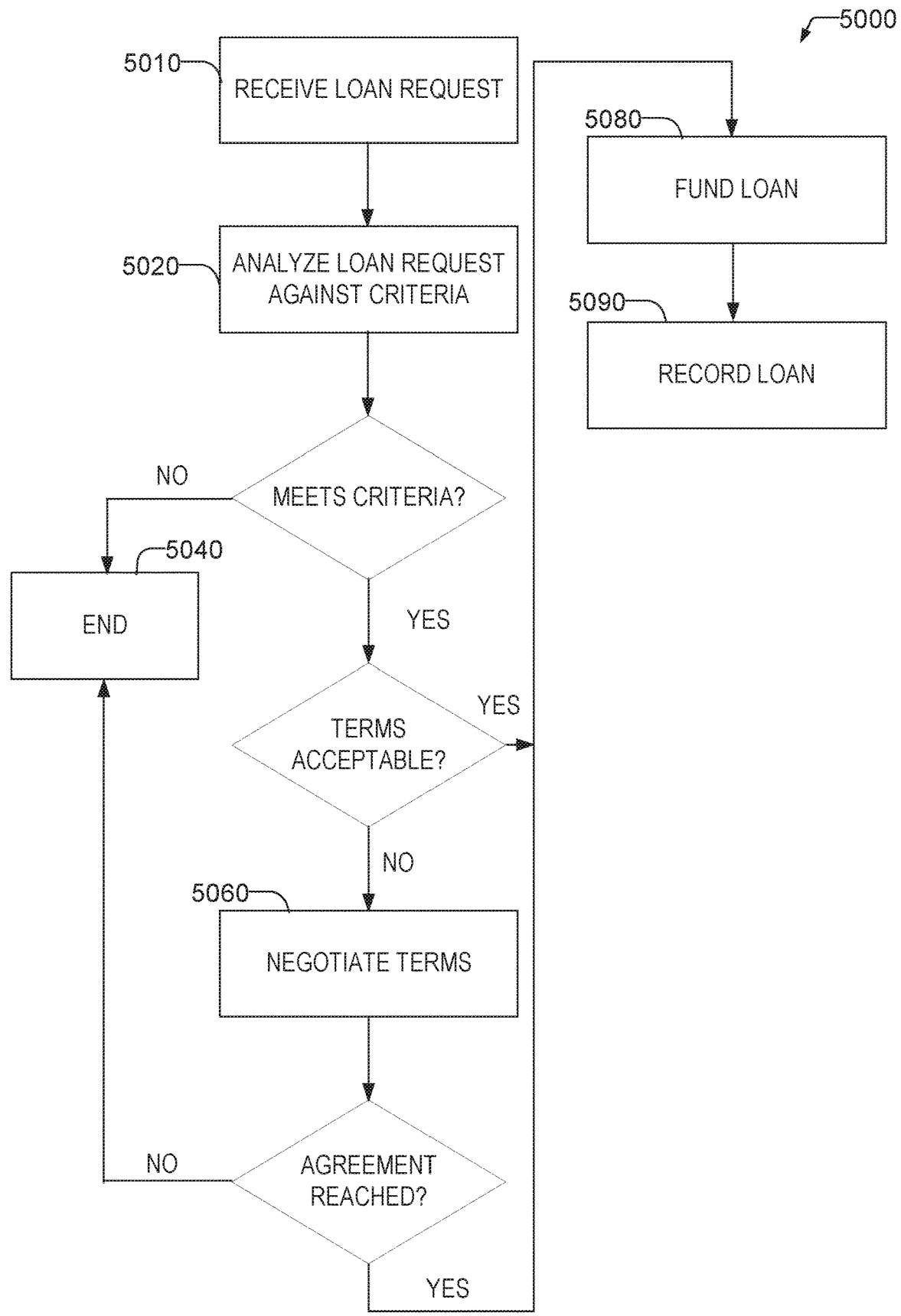
FIG. 5 shows a flowchart of a method of a mobile wallet processing a received loan request according to some examples of the present disclosure.

FIG. 5 shows a flowchart of a method 5000 of a mobile wallet processing a received loan request. At operation 5010 the mobile wallet may receive the loan request. In some examples, the mobile wallet may forward the loan request to other mobile wallets (e.g., those in a list of known mobile wallets, or to other mobile wallets via a broadcast). At operation 5020 the mobile wallet may analyze the loan request to determine whether the loan request meets certain criteria. For example, the criteria may be determined prior to receiving the loan request and may include criteria on a minimum credit score, a maximum risk rating (e.g., as determined by a third party such as a risk assessor (e.g., risk assessor), a loan amount, repayment terms, and the like. Criteria may be complex rule based statements, such as if the loan amount is <$1000 and if minimum credit score >500 then proceed and if the loan amount is >=$1000 and if minimum credit score >700 then proceed. If the criteria is not met, then at operation 5040 the mobile wallet may stop processing the request (and in some examples, send a rejection message). If the criteria is met a check may be made to determine if the terms (e.g., interest rate, repayment terms, and the like) are acceptable. If the terms are not acceptable, the mobile wallet may communicate with the requesting mobile wallet to negotiate the terms at operation 5060. As part of this negotiation, in some examples, the mobile wallet may send a response with a counter-offer. If the terms are acceptable, the mobile wallet may send a response and funds the loan at operation 5080 and records the loan at operation 5090.

Negotiation such as at operation 5060 may comprise one or more proposals and counter proposals on various terms. The negotiations may be automatic. For example, the mobile wallet may have one or more rules for negotiation. These rules may have desired terms and acceptable terms. Acceptable terms may be the minimum (or maximum) term that the mobile wallet is willing to agree upon. For example, the user of the mobile wallet may set a limit on the term of the loan at 3 months. The desired terms may be what the mobile wallet user would like ideally. For example, a term of 1 month. The mobile wallet may start negotiations at the desired terms and in each successive round of negotiation move towards the acceptable terms. The mobile wallet may not propose terms worse than the acceptable terms. The criteria from operation 5020 and the acceptable and desired terms may be interrelated. For example, the criteria may be terms or other rules that are required to even begin negotiating, while the acceptable and desired terms are negotiation parameters. These same parameters (e.g., acceptable and desired terms) may also be utilized on the borrower side to engage in automatic negotiations. In other examples, the analysis at operation 5020 may be the only analysis undertaken, that is, if the loan may only be funded if the loan meets the criteria in operation 5020 (e.g., there may not be a separate negotiation stage).

At some point, negotiations may reach an impasse. For example, where the borrower is unwilling to offer a term that meets an acceptable term (e.g., detected based upon repeatedly refusing to meet the acceptable term), the negotiations have failed and processing will end at operation 5040. A rejection may be sent at operation 5040. If an agreement was reached, at operation 5080 an acceptance may be sent and the loan may be funded. At operation 5090 the loan may be recorded as previously described (e.g., sent to other mobile wallets or a centralized service for inclusion in a blockchain).

Figure 6:
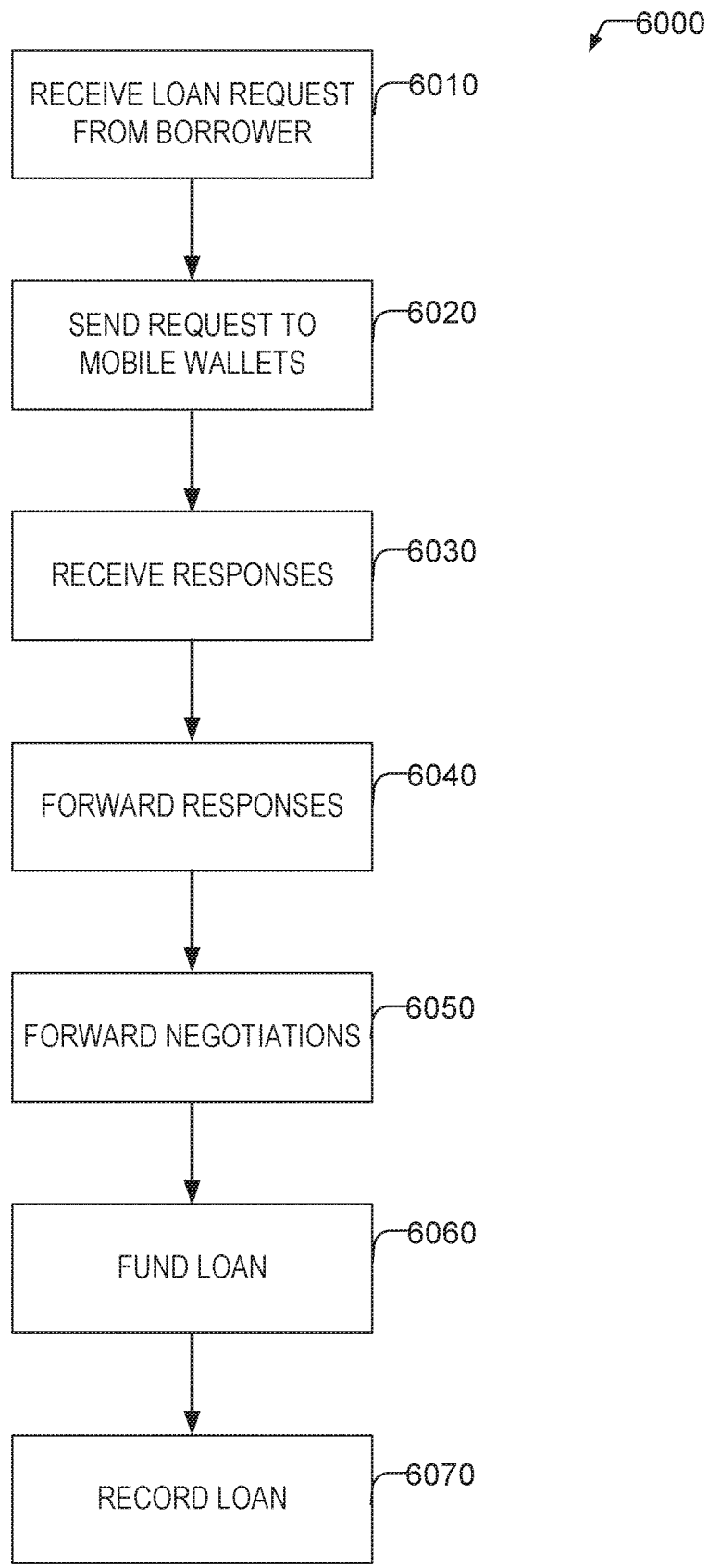
FIG. 6 shows a flowchart of a method of a P2P loan service receiving and processing a loan request according to some examples of the present disclosure.

FIG. 6 shows a flowchart of a method 6000 of a P2P loan service receiving and processing a loan request according to some examples of the present disclosure. In some examples, mobile wallets will register with the P2P loan service. For example, mobile wallets may send information about themselves to the P2P loan service such as their preferences on whether they wish to lend money to others, borrow money from others or both. Additionally, the mobile wallets may include their contact information. At operation 6010, a loan request is received from a mobile wallet borrower. At operation 6020 the request may be sent to registered mobile wallets that have indicated an interest in lending. In some examples, during registration the mobile wallets may indicate notification criteria that is to be met before the mobile wallet is notified of the loan request. In some examples, at operation 6020 the P2P loan service only sends the loan request to mobile wallets where the request meets that wallet's notification criteria.

At operation 6030, the P2P loan service may receive responses from the requests sent at operation 6020. These responses are forwarded to the requestor at operation 6040. During the negotiation phases, the P2P loan service may forward messages between the mobile wallets at operation 6050. In some examples, operations 6030, 6040, and 6050 are not performed as the borrower mobile wallet and lender mobile wallets directly communicate. At operation 6060 once an agreement is reached, the P2P loan service may assist in funding the loan. At operation 6070, the loan may be recorded (e.g., in a blockchain or database).

Figure 7:
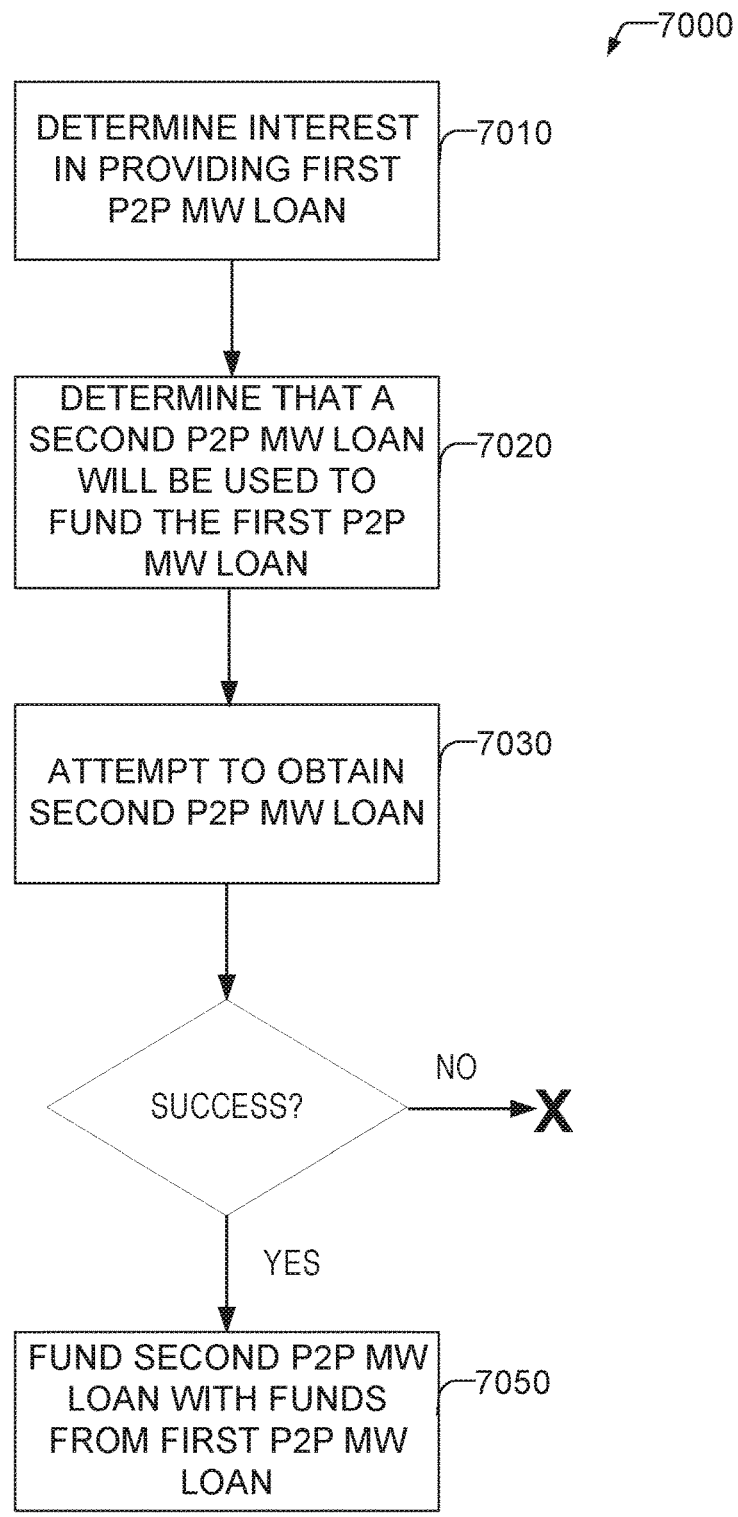
FIG. 7 shows a flowchart of a method of utilizing a loan between a user of a mobile wallet and a lender to fund another loan between the user and a borrower according to some examples of the present disclosure.

Turning now to FIG. 7, a flowchart of a method 7000 of utilizing a loan between a user of a mobile wallet and a lender to fund another loan between the user and a borrower is shown according to some examples of the present disclosure. At operation 7010 the mobile wallet may determine an interest in providing a first P2P MW loan to a requesting borrower. For example, the mobile wallet may perform operations 5010, 5020, and determined that the loan request meets initial criteria. At operation 7020 the mobile wallet may determine that a second P2P MW loan will be utilized to fund the first P2P MW loan. For example, the mobile wallet may determine that an amount of funds to provide the requesting borrower is not available. At operation 7030, the mobile wallet may perform the operations 4000 of obtaining a P2P MW loan to obtain a second loan for the funds needed to fund the first loan. In some examples, the negotiation operations 4040 and 5060 may be executed at the same time—for example, the terms offered to the borrower may depend on the terms that can be negotiated from the lender of the second loan. An agreement may be reached only if the terms accepted by the borrower and the lender of the second loan are such that the user of the mobile wallet is satisfied with the difference (e.g., such that the mobile wallet makes a profit). This satisfaction may be expressed through a set of rules that define the difference between the terms offered the borrower and the terms of the lender. If the mobile wallet is able to obtain terms from a lender and from the buyer that are acceptable (as measured by rule sets), the second P2P loan may be funded with funds from the first P2P MW loan at operation 7050.

Figure 8:
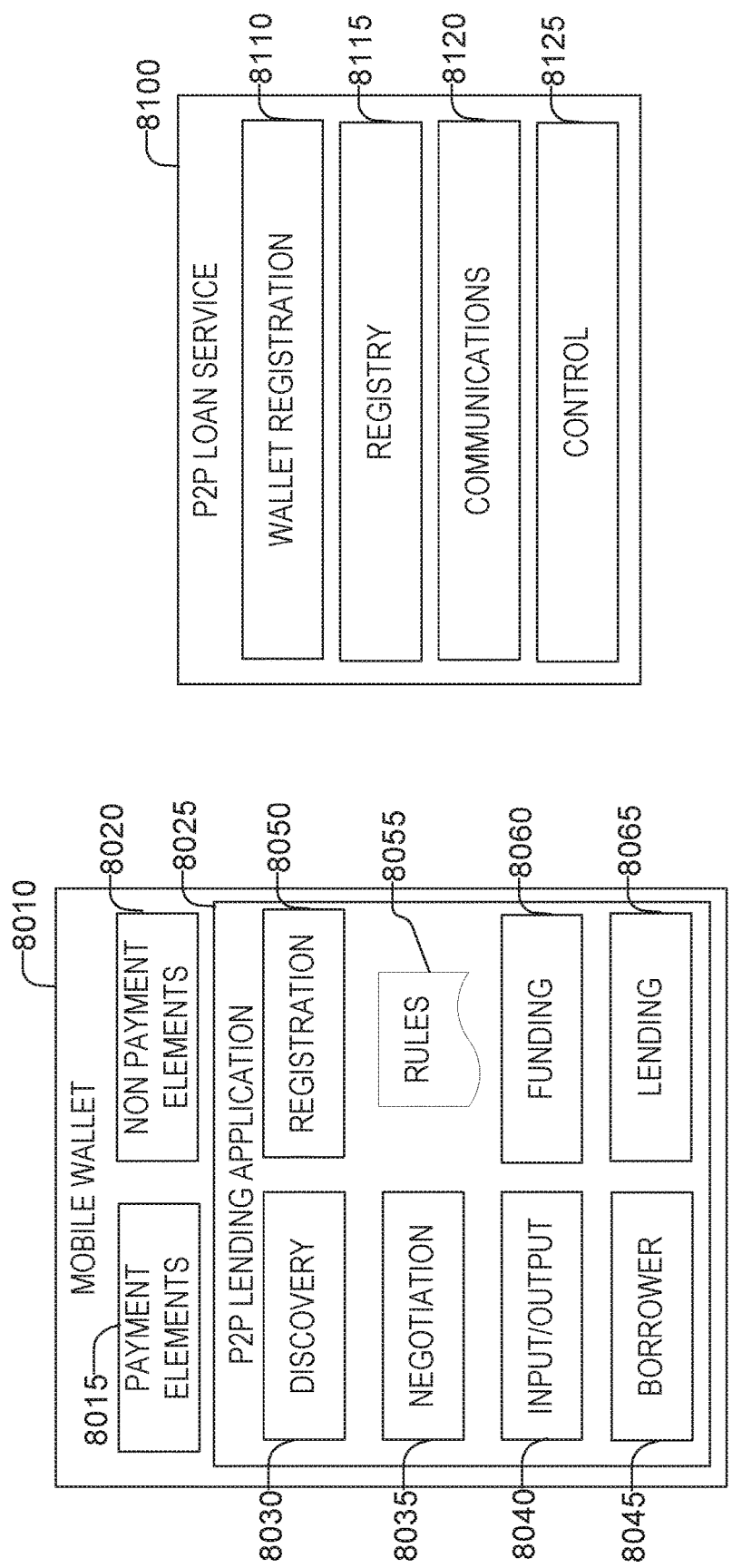
FIG. 8 shows a logical diagram of a mobile wallet and P2P loan service according to some examples of the present disclosure.

FIG. 8 shows a logical diagram of a mobile wallet 8010 and P2P loan service 8100 according to some examples of the present disclosure. Mobile wallet 8010 may execute on one or more computing devices and may be implemented by hardware, software, or a combination of hardware and software. P2p loan service 8100 may execute on one or more computing devices and may be implemented by hardware, software, or a combination of hardware and software. Mobile wallet 8010 may include one or more payment elements 8015. Payment elements may be credit cards, debit cards, checking accounts, and the like. In some examples, a P2P lending application 8025 may be selectable as a payment element. In these examples, the P2P lending application 8025 may allow mobile wallet 8010 to pay for goods or services with a P2P loan obtained through P2P lending application 8025 using the techniques described herein. Non-payment elements 8020 may include identification cards, library cards, discount cards, and the like. P2p lending application may have a discovery component 8030 which may discover other mobile wallets as previously described. Registration component 8050 may register the mobile wallet 8010 with a P2P loan service (e.g., P2P loan service 8100) in examples in which a P2P loan service is utilized. Registration component 8050 may also record any loans (either as borrower or lender) in a blockchain or with the P2P loan service 8100. Negotiation component 8035 may utilize rules to evaluate and negotiate loans (either as a borrower or lender). Input and Output component 8040 may communicate with other mobile wallets (e.g., as a P2P communication or through the P2P loan service) and in some examples, communicate with the P2P loan service 8100. For example, the input and output component 8040 may implement one or more messaging protocols to communicate with other mobile wallets and/or the P2P loan service 8100 over a computer network.

Funding component 8060 handles funding loans and receiving funds from loans as well as, in some examples, providing those funds to merchants and other users to make purchase. Borrower component 8045 may implement logic to control the process of requesting a loan, negotiating terms, recording the loan, receiving funding, and other processes in conjunction with the other components of the mobile wallet 8010. For example, control the process of FIGS. 4, and 7. Lending component 8065 may implement logic to control the process of receiving and processing a loan request, negotiating terms, recording the loan, sending funding, and other processes in conjunction with the other components of the mobile wallet 8010. For example, control the process of FIG. 5. In some examples, rules 8055 may include notification rules, action rules, negotiation rules, and the like. Rules 8055 may be configured by a user through a user interface provided by input and output component 8040. Additionally a user may request a loan or select the P2P lending application, view information about loans, and the like through this user interface. The user interfaces may be Graphical User Interfaces (GUIs).

P2p loan service 8100 may be a network based service to facilitate P2P mobile wallet loans. Wallet registration component 8110 may handle and respond to registration requests by storing wallet information in registry 8115. This may include various rules (e.g., notification and action rules) and preferences of the various mobile wallets. Communications component 8120 may communicate with one or more mobile wallets. For example, communications component 8120 may implement one or more protocols to communicate with one or more mobile wallets over a computer network. Control component 8125 may receive (via the communications component 8120) a loan request, determine a set of mobile wallets that should be notified (based upon notification rules) and send the request to those mobile wallets. In some examples, based upon action rules, the P2P loan service may automatically accept a loan on behalf of a mobile wallet. Control component 8125 may then notify the lender mobile wallet and the borrower mobile wallet and process the funding. Communications component 8120 may also route communications between mobile wallets.

Figure 9:
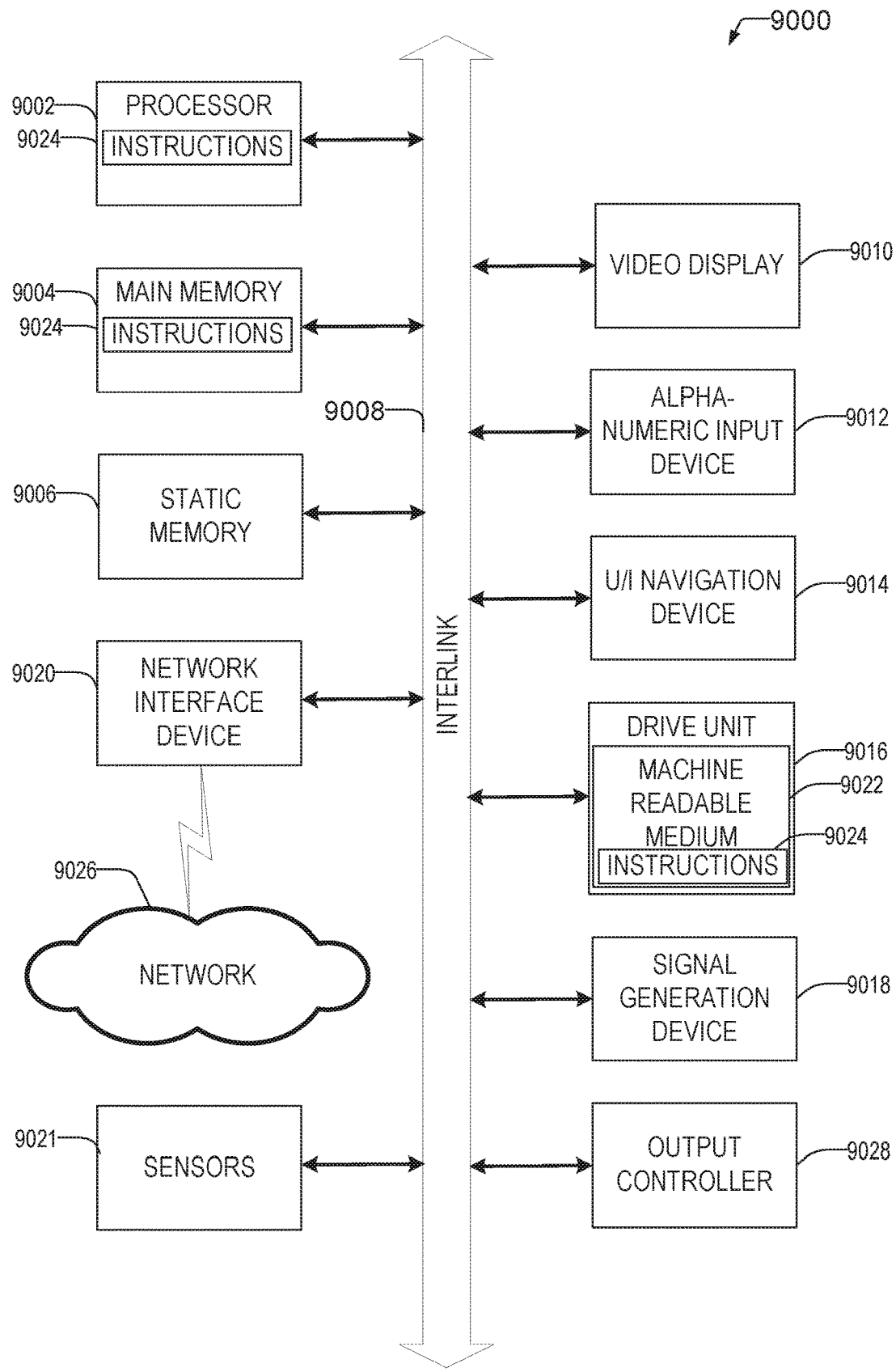
FIG. 9 is a block diagram illustrating an example of a machine upon which one or more embodiments may be implemented.

FIG. 9 illustrates a block diagram of an example machine 9000 upon which any one or more of the techniques (e.g., methodologies) discussed herein may perform. In alternative embodiments, the machine 9000 may operate as a stand-alone device or may be connected (e.g., networked) to other machines. In a networked deployment, the machine 9000 may operate in the capacity of a server machine, a client machine, or both in server-client network environments. In an example, the machine 9000 may act as a peer machine in peer-to-peer (P2P) (or other distributed) network environment. The machine 9000 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. For example, one or more machines, such as machine 9000 may implement a borrower mobile wallet, a lender mobile wallet, a risk assessor, a P2P loan service. Furthermore, one or more machines (such as machine 9000) may implement the messaging and methods of FIGS. 1-7. One or more machines (such as machine 9000) may be configured by hardware or software to include the components of the mobile wallet 8010 and/or P2P loan service 8100 of FIG. 8. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 9000 may include a hardware processor 9002 (e.g., a central processing unit (CPU), a graphics processing unit (GPU), a hardware processor core, or any combination thereof), a main memory 9004 and a static memory 9006, some or all of which may communicate with each other via an interlink (e.g., bus) 9008. The machine 9000 may further include a display unit 9010, an alphanumeric input device 9012 (e.g., a keyboard), and a user interface (UI) navigation device 9014 (e.g., a mouse). In an example, the display unit 9010, input device 9012 and UI navigation device 9014 may be a touch screen display. The machine 9000 may additionally include a storage device (e.g., drive unit) 9016, a signal generation device 9018 (e.g., a speaker), a network interface device 9020, and one or more sensors 9021, such as a global positioning system (GPS) sensor, compass, accelerometer, or other sensor. The machine 9000 may include an output controller 9028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 9016 may include a machine readable medium 9022 on which is stored one or more sets of data structures or instructions 9024 (e.g., software) embodying or utilized by any one or more of the techniques or functions described herein. The instructions 9024 may also reside, completely or at least partially, within the main memory 9004, within static memory 9006, or within the hardware processor 9002 during execution thereof by the machine 9000. In an example, one or any combination of the hardware processor 9002, the main memory 9004, the static memory 9006, or the storage device 9016 may constitute machine readable media.

While the machine readable medium 9022 is illustrated as a single medium, the term "machine readable medium" may include a single medium or multiple media (e.g., a centralized or distributed database, and/or associated caches and servers) configured to store the one or more instructions 9024.

The term "machine readable medium" may include any medium that is capable of storing, encoding, or carrying instructions for execution by the machine 9000 and that cause the machine 9000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 9024 may further be transmitted or received over a communications network 9026 using a transmission medium via the network interface device 9020. The Machine 9000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 9020 may include one or more physical jacks (e.g., Ethernet, coaxial, or phone jacks) or one or more antennas to connect to the communications network 9026. In an example, the network interface device 9020 may include a plurality of antennas to wirelessly communicate using at least one of single-input multiple-output (SIMO), multiple-input multiple-output (MIMO), or multiple-input single-output (MISO) techniques. In some examples, the network interface device 9020 may wirelessly communicate using Multiple User MIMO techniques.

What is claimed is:

1. A method for electronic wallet to electronic wallet lending, the method comprising:
    at a first electronic wallet application executing on a first computing device:
    sending a broadcast discovery message over a packet-based computer network;
    receiving, over the packet-based computer network, a plurality of response messages to the broadcast discovery message from a respective plurality of other electronic wallet applications executing on a respective plurality of other computing devices;

sending a loan request message requesting a loan to the plurality of other electronic wallet applications executing on a respective plurality of other computing devices;

receiving a response over the packet-based computer network from a second electronic wallet application, the second electronic wallet application not in the plurality of other electronic wallet applications, the second electronic wallet application receiving the loan request message from one of the plurality of other electronic wallet applications, the response indicating that the second electronic wallet application agrees to provide the loan and terms of the loan;

receiving an input from a user of the first computing device indicating acceptance of the terms of the loan;

responsive to receiving the input, recording the terms of the loan in a block of a distributed blockchain data structure by broadcasting the terms of the loan to at least two of the plurality of other electronic wallet applications; and responsive to recording the terms of the loan in the block of the distributed blockchain data structure, receiving funds from the second electronic wallet application.

2. The method of claim 1, wherein the second electronic wallet application obtains the funds from a third electronic wallet application using another loan.

3. The method of claim 1, wherein the funds are provided from a payment element stored in the second electronic wallet application.

4. The method of claim 1, wherein the terms of the loan include repayment terms and an interest rate.

5. The method of claim 1, wherein the loan request message includes proposed terms and wherein the terms of the loan in the response includes a counter-proposal with terms that are different in at least one aspect than the proposed terms.

6. The method of claim 1, wherein the response indicates that the second electronic wallet application agrees to provide a portion of the loan and not an entire amount requested in the loan request message.

7. The method of claim 1, further comprising:
receiving a counter-offer from the second electronic wallet application, the counter-offer including second terms that are different in at least one aspect than first terms in the loan request message;
sending a counter-counter-offer to the second electronic wallet application with third terms that are different in at least one aspect than the first terms and at least one aspect than the second terms, the third terms selected based upon the first terms, second terms, and one or more rules; and
wherein the response is sent by the second electronic wallet application responsive to the counter-counter-offer.

8. A computing device for electronic wallet to electronic wallet lending, the device comprising:
one or more processors;
a memory, storing instructions for an electronic wallet application, the electronic wallet application, when executed by the one or more processors, causes the computing device to perform operations comprising:
sending a broadcast discovery message over a packet-based computer network;
receiving, over the packet-based computer network, a plurality of response messages to the broadcast discovery message from a respective plurality of other electronic wallet applications executing on a respective plurality of other computing devices;
sending a loan request message requesting a loan to the plurality of other electronic wallet applications executing on a respective plurality of other computing devices;
receiving a response over the packet-based computer network from a second electronic wallet application, the second electronic wallet application not in the plurality of other electronic wallet applications, the second electronic wallet application receiving the loan request message from one of the plurality of other electronic wallet applications, the response indicating that the second electronic wallet application agrees to provide the loan and terms of the loan;
receiving an input from a user of the computing device indicating acceptance of the terms of the loan;
responsive to receiving the input, recording the terms of the loan in a block of a distributed blockchain data structure by broadcasting the terms of the loan to at least two of the plurality of other electronic wallet applications; and
responsive to recording the terms of the loan in the block of the distributed blockchain data structure, receiving funds from the second electronic wallet application.

9. The device of claim 8, wherein the second electronic wallet application obtains the funds from a third electronic wallet application using another loan.

10. The device of claim 8, wherein the funds are provided from a payment element stored in the second electronic wallet application.

11. The device of claim 8, wherein the terms of the loan include repayment terms and an interest rate.

12. The device of claim 8, wherein the loan request message includes proposed terms and wherein the terms of the loan in the response includes a counter-proposal with terms that are different in at least one aspect than the proposed terms.

13. The device of claim 8, wherein the response indicates that the second electronic wallet application agrees to provide a portion of the loan and not an entire amount requested in the loan request message.

14. The device of claim 8, wherein the operations further comprise:
receiving a counter-offer from the second electronic wallet application, the counter-offer including second terms that are different in at least one aspect than first terms in the loan request message;
sending a counter-counter-offer to the second electronic wallet application with third terms that are different in at least one aspect than the first terms and at least one aspect than the second terms, the third terms selected based upon the first terms, second terms, and one or more rules; and wherein the response is sent by the second electronic wallet application responsive to the counter-counter-offer.

15. A non-transitory machine-readable medium, for storing instructions for electronic wallet to electronic wallet lending, the instructions, when executed by a computing device, causes the computing device to perform operations comprising:
sending a broadcast discovery message over a packet-based computer network;
receiving, over the packet-based computer network, a plurality of response messages to the broadcast discovery message from a respective plurality of other electronic wallet applications executing on a respective plurality of other computing devices;

sending a loan request message requesting a loan to the plurality of other electronic wallet applications executing on a respective plurality of other computing devices;

receiving a response over the packet-based computer network from a second electronic wallet application, the second electronic wallet application not in the plurality of other electronic wallet applications, the second electronic wallet application receiving the loan request message from one of the plurality of other electronic wallet applications, the response indicating that the second electronic wallet application agrees to provide the loan and terms of the loan;

receiving an input from a user of the computing device indicating acceptance of the terms of the loan;

responsive to receiving the input, recording the terms of the loan in a block of a distributed blockchain data structure by broadcasting the terms of the loan to at least two of the plurality of other electronic wallet applications; and responsive to recording the terms of the loan in the block of the distributed blockchain data structure, receiving funds from the second electronic wallet application.

16. The non-transitory machine-readable medium of claim 15, wherein the second electronic wallet application obtains the funds from a third electronic wallet application using another loan.

17. The non-transitory machine-readable medium of claim 15, wherein the funds are provided from a payment element stored in the second electronic wallet application.

18. The non-transitory machine-readable medium of claim 15, wherein the terms of the loan include repayment terms and an interest rate.

19. The non-transitory machine-readable medium of claim 15, wherein the loan request message includes proposed terms and wherein the terms of the loan in the response includes a counter-proposal with terms that are different in at least one aspect than the proposed terms.

20. The non-transitory machine-readable medium of claim 15, wherein the response indicates that the second electronic wallet application agrees to provide a portion of the loan and not an entire amount requested in the loan request message.

* * * * *